(12) United States Patent
Feng et al.

(10) Patent No.: US 8,260,801 B2
(45) Date of Patent: Sep. 4, 2012

(54) METHOD AND SYSTEM FOR PARALLEL FLOW-AWARED PATTERN MATCHING

(75) Inventors: Bo Feng, Beijing (CN); Hong Bin Lu, Beijing (CN); Kai Zheng, QingHe (CN)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 12/109,666

(22) Filed: Apr. 25, 2008

(65) Prior Publication Data
US 2008/0270399 A1   Oct. 30, 2008

(30) Foreign Application Priority Data
Apr. 29, 2007   (CN) .......................... 2007 1 0102159

(51) Int. Cl.
*G06F 7/00*   (2006.01)
(52) U.S. Cl. ........................................ 707/764
(58) Field of Classification Search .................. 707/764
See application file for complete search history.

(56) References Cited

U.S. PATENT DOCUMENTS

| | | | |
|---|---|---|---|
| 2002/0184381 A1* | 12/2002 | Ryan et al. ..................... | 709/234 |
| 2004/0151382 A1* | 8/2004 | Stellenberg et al. .......... | 382/219 |
| 2004/0174820 A1 | 9/2004 | Ricciulli | |
| 2005/0132107 A1* | 6/2005 | Cornet et al. ................... | 710/71 |

FOREIGN PATENT DOCUMENTS
WO    WO2007005704 A1    1/2007

OTHER PUBLICATIONS

A. V. Aho and M. J. Corasick, "Efficient string matching: An aid to bibliographic search," Commum. ACM, vol. 18, pp. 333-340, 1975.
Martin Roesch. Snort-lightweight intrusion detection for networks [C]. In: Proceedings of the 13th System Administration Conference, USENIX, 1999.
S Wu, U Manber. A fast algorithm for multi-pattern searching [R]. Technical Report TR-94-17, University of Arizona, 1994.
Young H. Cho and William H. Mangione-Smith. Fast Reconfiguring Deep Packet Filter for 1+ Gigabit Network. University of California.

* cited by examiner

*Primary Examiner* — Truong Vo
(74) *Attorney, Agent, or Firm* — Gail H. Zarick; Anne Vachon Dougherty

(57) ABSTRACT

A system for parallel flow-awared pattern matching and a method thereof for performing distributed detection for incoming flows are provided. The system includes a pattern-set-partitioner for partitioning a pattern set for pattern matching into a number of pattern subsets in advance, a plurality of pattern matching engines, and a scheduler. The pattern matching engines each perform pattern matching for the incoming flows. The scheduler selects a number of pattern matching engines equal to the number of the partitioned pattern subsets from all the pattern matching engines and allocates pattern matching tasks, each performing flow matching against one pattern subset, to the selected pattern matching engines. With the system and method of the present invention, distributed detection can be performed by partitioning rules/pattern set to realize load-balancing parallel flow-awared pattern matching.

20 Claims, 7 Drawing Sheets

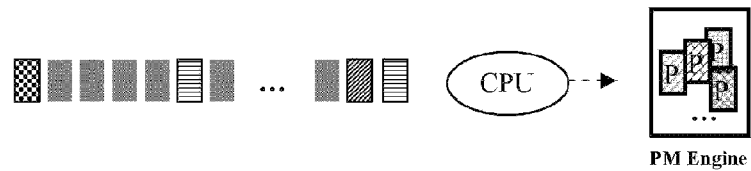
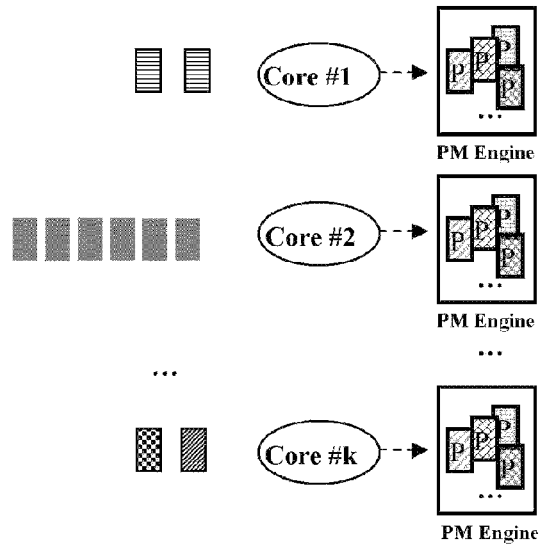
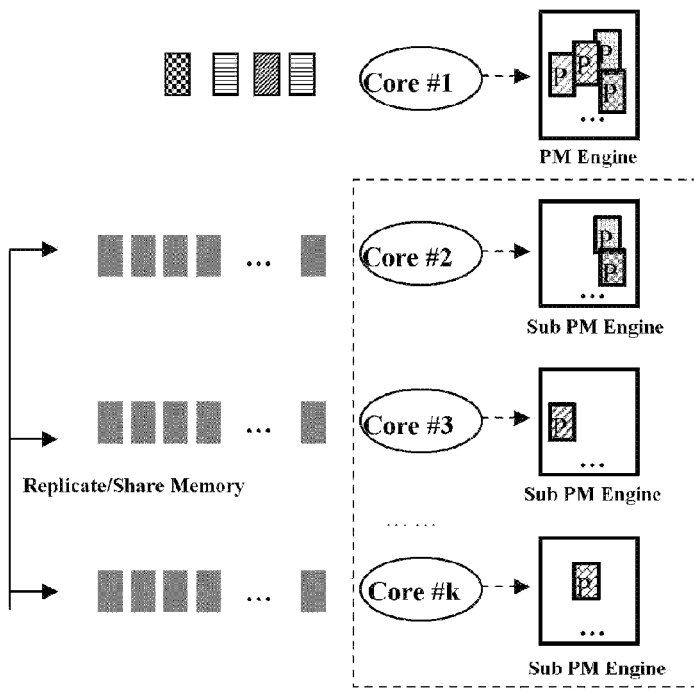
Fig. 1
Fig. 2

METHOD AND SYSTEM FOR PARALLEL FLOW-AWARED PATTERN MATCHING

CROSS-REFERENCE TO RELATED APPLICATIONS

This application claims priority under 35 U.S.C. 119 from China Patent Application No. 200710102159.4 filed Apr. 29, 2007, the entire contents of which are incorporated herein by reference.

BACKGROUND OF THE INVENTION

1. Field of the Invention

The present invention relates to distributed detection for network intrusion, and more particularly, relates to a system for parallel flow-awared pattern matching and a method thereof.

2. Description of the Related Art

DPI (Deep Packet Inspection), more specifically Pattern Matching (PM), for Network Intrusion Detection, as a kind of key method for many emerging and popular-gaining network monitoring and analysis application such as NIDS (Network Intrusion Detection System), is recognized as both computation and communication (i.e. I/O) intensive. Usually, DPI applications are required to match large volume network traffic against a big pattern set. The demanded performance proportionally relates to the wire-speed of the network interface being monitored against (since DPI deals with not only packet headers but also the payloads), which together makes DPI realization extremely hard for a huge pattern set over a multi Giga bit line-rate.

As a replacement for the last generation of Network Processors, the Multi-core processor (CMP/SMP/SMT) system, which has a much higher computing power, is a promising processing platform because it provides higher programmability and scalable processing/computing power than traditional hardware solutions. However, the traditional parallel programming model for data load-balancing can hardly be adopted by DPI processing. For example, the traditional parallel programming model for data-based load balancing is inefficient when adopted for PM processing in NIDS. The data transmitted over networks are usually in terms of flows (namely, the packet flow between an arbitrary source-destination communication pair). For PM in NIDS, the packet data within a flow has a strong dependency with each other and must be processed in sequence to avoid missed detection or false detection. An unfortunate fact is that network flow might be extremely unevenly distributed in terms of size, and some flows may even dominate the whole cable bandwidth in certain cases (e.g. due to the existence of VPN tunnels, some flows may even dominate the whole line bandwidth). This makes it extremely hard to highly utilize the processing power of the multi-core platforms and realize an efficient flow-awared dynamic load-balancing via traditional load-balancing approaches. A traditional packet-based parallel processing model is illustrated in FIG. 1, in which parallel processing is compared to original serial processing.

The load-balancing model based on sub-tasks partitioning, namely the Pipelining model, is an alternative to leverage the multi-core processor systems. One of its strengths is its In-Order processing retains the data dependency within the packet flows. However, note that only when the sub-tasks/pipeline-stages are evenly partitioned can the computation resources of multi-core processors be fully utilized to achieve optimal gain. Unfortunately, since the sub-tasks are usually pre-divided and dispatched, the pipeline model suffers from very low adaptive ability, thus making it hard to achieve an even partition of the task based on the DPI processing code. Due to the existence of monolithic sub-tasks and the sophisticated branching in the code path of NIDS, it is extremely hard to balance the workload under this model, especially in a dynamic way, therefore causing an inability to achieve high resource utilization.

All signs lead to the need for developing a new programming model for high performance DPI applications to realize a more efficient DPI processing engine. Such a programming model needs not only the instinct of retaining data dependency within the packet flows, but also the ability to balance the workload among the parallel processor resources more perfectly in dynamic ways.

BRIEF SUMMARY OF THE INVENTION

In view of this, it is an object of the invention to provide a system for parallel flow-awared pattern matching and a method thereof capable of performing distributed detection by partitioning a rules/pattern set to realize load-balancing parallel flow-awared pattern matching.

To realize the object of the present invention, a parallel flow-awared pattern matching system for performing distributed detection for incoming flows is provided. The system comprises a pattern-set-partitioner for partitioning a pattern set for pattern matching into a number of pattern subsets in advance; a plurality of pattern matching engines, each performing pattern matching for the incoming flows; and a scheduler for selecting a number of pattern matching engines equal to the number of the partitioned pattern subsets from all the pattern matching engines and allocating pattern matching tasks, each being used to perform flow matching against one pattern subset, to the selected pattern matching engines.

The system of the present invention may further include a mode selector for selecting, for a specific incoming flow to be detected, a distributed detection mode which is identified by the number of the pattern subsets by partitioning the pattern set, and providing the selected mode to the scheduler.

The present invention further provides a parallel flow-awared pattern matching method for performing distributed detection for incoming flows, comprising: partitioning a pattern set for pattern matching into a number of pattern subsets in advance; selecting a number of pattern matching engines equal to the number of the partitioned pattern subsets from all the pattern matching engines from all the pattern matching engines for performing pattern matching for the incoming flows and allocating pattern matching tasks, each being used to perform flow matching against one pattern subset, to the selected pattern matching engines.

The method of the present invention may further include selecting, for a specific incoming flow to be detected, a distributed detection mode which is identified by the number of the pattern subsets by partitioning the pattern set.

The present invention further provides a program to cause the computer to carry out a parallel flow-awared pattern matching method for performing distributed detection for incoming flows, comprising: partitioning a pattern set for pattern matching into a number of pattern subsets in advance; selecting a number of pattern matching engines equal to the number of the partitioned pattern subsets from all the pattern matching engines from all the pattern matching engines for performing pattern matching for the incoming flows and allocating pattern matching tasks, each being used to perform flow matching against one pattern subset, to the selected pattern matching engines.

The present invention further provides a computer readable recording media recording program thereon to cause the computer to carry out a parallel flow-awared pattern matching method for performing distributed detection for incoming flows, comprising: partitioning a pattern set for pattern matching into a number of pattern subsets in advance; selecting a number of pattern matching engines equal to the number of the partitioned pattern subsets from all the pattern matching engines from all the pattern matching engines for performing pattern matching for the incoming flows and allocating pattern matching tasks, each being used to perform flow matching against one pattern subset, to the selected pattern matching engines.

The present invention can provide the following advantages:
1) Large flow can be handled very well so that all CPU resources can be utilized for even a single huge flow while maintaining the corresponding data dependency;
2) The present invention can shorten the processing latency from the viewpoints of each flow;
3) Smaller "per unit" storage requirement because the rule set is cut smaller in size. This is essential for a system with very small cache or local storage, such as the IBM CELL processor or the ongoing Q7/PRISM processor.

BRIEF DESCRIPTION OF THE SEVERAL VIEWS OF THE DRAWINGS

FIG. 1 is a diagram for illustrating a traditional packet-based parallel processing model.

FIG. 2 is a diagram for illustrating a rule-set-partitioning approach according to the present invention to further divide the workload into small "pieces".

FIG. 4 (b) is a diagram for illustrating a processing flow of dynamic distributed detection according to the present invention.

FIG. 10 (b) is a diagram for showing load-balancing based on a scheme according to the present invention.

DETAILED DESCRIPTION OF THE INVENTION

Figure 3:
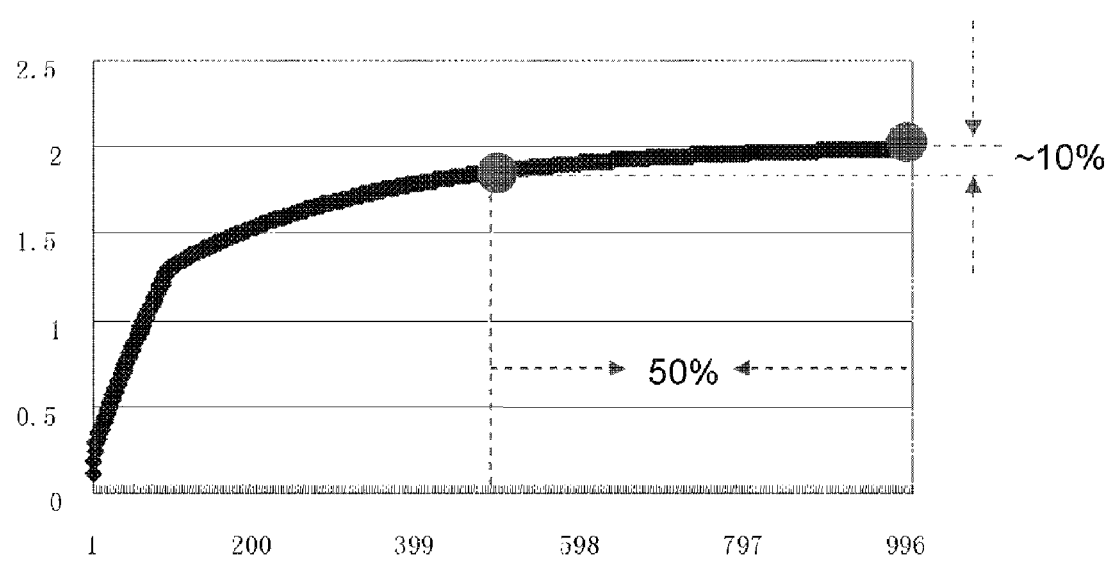
FIG. 3 is a diagram for illustrating the estimation of the relationship between the rule set size and the time complexity (in terms of memory reference per byte) of the MWM algorithm.

The present invention proposes a novel load-balancing distributed DPI engine, i.e. flow-awared pattern matching engine, and further proposes a dynamic load-balancing distributed DPI engine.

Note that according to the study of the inventors:
For the DPI workloads, one of the key characteristics of flow-awared pattern matching is that the CPU instructions handles two kinds of data, the packet flows to be inspected and the rules/pattern set to be matched against. The latter (the rules/patterns) does not have data dependency with each other when being divided and processed separately, while the former (the packet flows) does. That is to say, if a packet flow is divided into several partitions to be processed separately, there is data dependency among the processed results, so it must be performed in sequence. However, if the pattern set is divided to detect/be matched against packet flows separately, the processes are independent from each other and can be performed in parallel. The method of partitioning a pattern set into a plurality of subsets to detect packet flows separately is referred to as distributed detection ($D^2$). Certain idle CPU resources can be leveraged to shorten the processing time by balancing the workload among multiple computation units (i.e. CPUs) by $D^2$.

However, on the other hand, applying $D^2$ may also introduce extra overhead because, although the workload may be balanced among multiple computation units, extra memory accesses or CPU instructions may be required. Furthermore, using $D^2$ improperly may, instead, do harm to the performance.

Based on these observations by the inventors, by partitioning the patterns/rules set in several optimized ways and dynamically selecting the running mode according to both the packet flow information and system wide information, a novel load-balancing scheme called dynamic distributed detection ($D^3$) is proposed. After applying $D^3$, the huge workload can then be fine partitioned and the loads/tasks can be perfectly balanced among the processors, while the corresponding data dependency/correlation is maintained and negative effects caused by the overhead are avoided.

The present invention will be described in detail in conjunction with the accompanying drawings and specific example implementations.
1. The Primitive Idea: Distributed Detection ($D^2$)

As shown in FIG. 1, partitioning the workload based on packet flows is not sufficient because the flows' sizes does not uniformly distribute and the sizes of the flows differ largely. Therefore, traditional load-balancing approach may not fully leverage the parallel resources. The point is that ways other than flow-based task allocation need to be explored to further partition the workload, especially the workload of large packet flows. In the present invention, a novel method based on rule set partitioning, called distributed detection ($D^2$) is proposed.

As shown in FIG. 1, the flow denoted in solid is very hot and nearly consumes the resources of the overall DPI system. However, due to the strong dependency of the packet data within the flow, it must be processed in sequence. The traditional load-balancing approach can hardly dispatch the workload of the flow denoted in solid to multiple DPI engines to be processed in parallel.

The idea of the present invention is to shift the focus from the network packet flows to the rules/patterns set, which is usually neglected by traditional methods. Note that what the idea of the present invention needs is only to ensure that all the contents in the packet flows are compared with all the patterns in the rules set. FIG. 2 is a diagram for illustrating a rule-set-partitioning approach according to the present invention to further divide the workload into small "pieces". Partitioning the pattern set, besides the packet flows, is another efficient way to partition the PM's workload, as shown in FIG. 2.

More specifically, in the $D^2$ scheme, rules/patterns are allocated among multiple engines based on certain optimization principles (as will be described thereafter); the hot packet flows are replicated to multiple PM engines for comparison with the patterns subsets, respectively.

For example, as demonstrated in FIG. 2, the original large rule/pattern set is partitioned into three subsets and allocated to three different PM engines (also called sub-PM-engines) at the same time, respectively; the hot packet flow, i.e. the one denoted in solid, can then be detected by utilizing all the three sub-PM-engines simultaneously, in a distributed way. In this way, the workload is fine partitioned and the CPU utilization is boosted. Since the pattern set shrinks for each sub PM engine, the matching time for each sub-PM-engine is reduced respectively. This is equivalent to sharing the workload among the three sub engines by replicating the flow or sharing memory, the latter being especially useful for a hardware platform with multiple CPUs and shared memory. Even if the approach of replicating the flow is applied, since storage is not a problem as far as modern computer systems are concerned and storage cost tends to be cheaper and cheaper, trading off storage efficiency for distributed detection performance is reasonable. Therefore, the hot flow is perfectly handled and the parallel resources are well utilized.

2. The Idea of Dynamic $D^2$ ($D^3$)

On the other hand, it is discovered from the study of the inventors that many state-machine-based pattern matching algorithms, such as Aho-Corasick (AC) algorithm (referred to A. V. Aho and M. J. Corasick, "Efficient string matching: An aid to bibliographic search," Commum. ACM, vol. 18, pp. 333-340, 1975), have complexity which is nearly independent of the size of the rule set (that is, shrinking the rule set would not benefit the performance); other hash-based algorithms, such as the well-known Wu-Manber (WM) algorithm (referred to S Wu, U Manber. A fast algorithm for multi-pattern searching [R]. Technical Report TR-94-17, University of Arizona, 1994); and the Modified-Wu-Manber algorithm (referred to Martin Roesch. Snort-lightweight intrusion detection for networks [C]. In: Proceedings of the 13$^{th}$ System Administration Conference, USENIX, 1999), although have rule-set size sensitive complexity, have a relatively small performance gain from shrinking the rule set size.

FIG. 3 is a diagram for illustrating the estimation of the relationship between the rule set size and the time complexity (in terms of memory reference per byte) of the MWM algorithm. As shown in FIG. 3, the horizontal axis indicates the number of rules and the vertical axis indicates the time complexity (in terms of memory reference per byte). It can be seen from the relationship graph that, for a rule set with about 1 k patterns, reducing half of the rules may only result in a 10% performance gain. This indicates that cutting a 1 k rule set into two 0.5 k subsets and using two CPUs to process respectively would introduce 2*90%–100%=80% additional CPU instructions or memory stalls, i.e. non-neglectable overhead would be introduced when using $D^2$. Thus, $D^2$ should be used in a careful way to prevent negative effects. Note that the MWM algorithm is one of the famous algorithms for multi-pattern matching, recognized as one with very good average performance. Furthermore, snort, one of the most famous open-source software-based NIDS, adopts MWM as the default algorithm in its latest version (v 2.4) for pattern matching. Therefore, without loss of generality/representation, MWM is taken as the example to demonstrate the idea of the present invention.

Figure 4A:
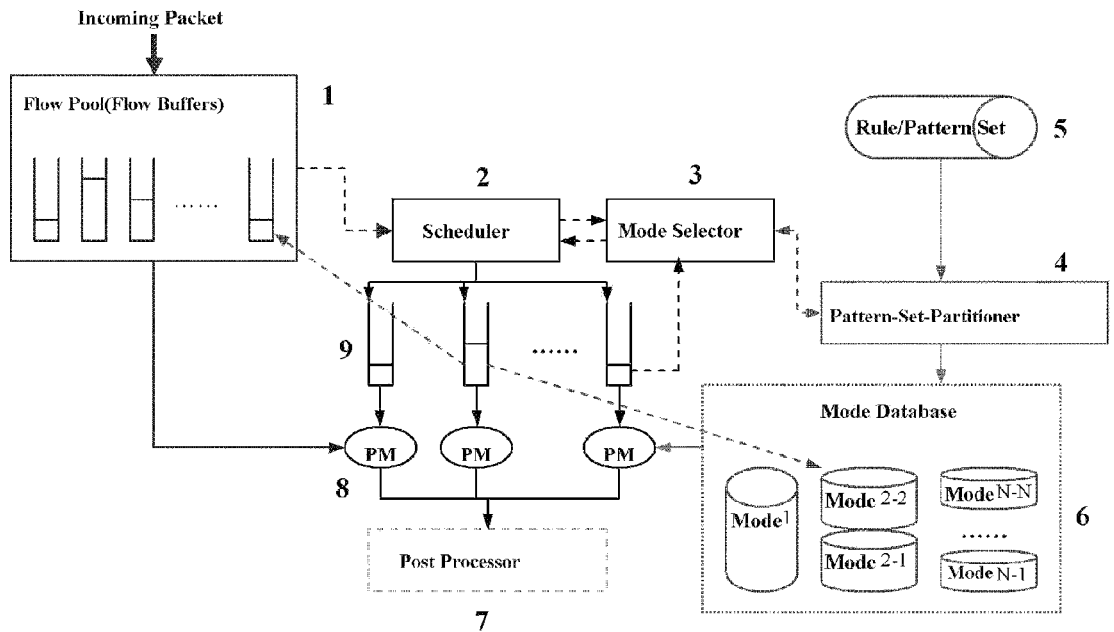
FIG. 4 (a) is a schematic diagram for illustrating the configuration of the dynamic distributed detection ($D^3$) system according to the present invention.
Figure 4B:
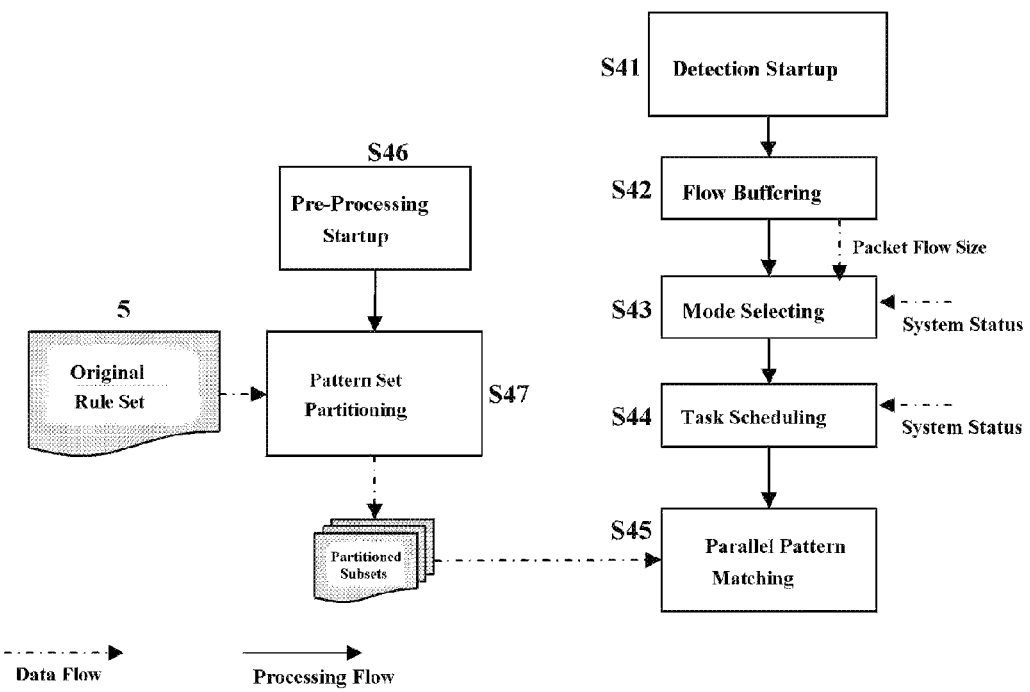

3. The System Architecture of $D^3$:

FIG. 4 (a) is a schematic diagram for illustrating the configuration of the dynamic distributed detection ($D^3$) system according to the present invention for realizing load-balancing parallel flow-awared pattern matching. As shown in FIG. 4(a), the proposed DPI system of the present invention for dynamic distributed detection mainly consists of a flow buffer 1, a scheduler 2, a mode selector 3, several pattern matching engines (PMs) 8 and PM FIFO (First-In First-Out) queues 9, and a pattern-set-partitioner 4. The processing flow of $D^3$ is shown in FIG. 4 (b).

Original Rule Set 5: Rules or patterns are the basis of detecting virus, hacker intrusions or other abnormal actions to the network. Generally, a matching rule/pattern includes some "strings" in accordance with abnormal characteristics of the network or logical combinations of some strings, where such "string" pattern appearing in data flows in the network means that abnormity occurs. Rules/patterns set is the set of all patterns. Generally, pattern sets are released by the national information security center or some software companies/organizations dedicated to fight against virus, or can be prepared by the user of the monitoring and detection system depending on specific conditions.

Pattern-Set-Partitioner 4: For every candidate mode, for example Mode X, the pattern-set-partitioner partitions the original rule set 5 into x subsets, according to the optimal algorithm (to be explained thereafter). In other words, for Mode I, there would be only one subset, two subsets for Mode II, . . . N subsets for Mode N, and so on. The result of the partitioning (i.e. all the possible modes) is stored in the mode database 6.

Mode Selector 3: Firstly, the term "Running Mode" is defined to be "the number of partitions the rule set is divided into in order to perform the detection in a distributed way, for a specific flow"; in other words the mode in which the distributed detection is performed ("Mode"). For example, when we say that the current flow would be detected using Mode x, that is to say the x-cut rule set (i.e. the one with x subsets) would be used for the distributed detection and x CPUs would be assigned to perform the detection on the flow at the same time. Mode 1 refers to performing the detection (pattern matching) against the entire rule set and not to partitioning the rule set. The mode selector 3 responds to decide for each flow by deciding which mode would be run to match the flow against the pattern set or subsets to perform the distributed detection according to the flow size and the status of PMs (e.g. their FIFOs's lengths), which will be explained in detail thereafter.

Scheduler 2: It checks the packet flows that have finished reassembly and are ready for match. Once a flow is ready, the scheduler 2 sends a request to the mode selector 3, "asking" which mode should be taken for this flow. For example, if Mode n is picked, the scheduler will then select n PMs out from all (e.g. based on their FIFO queue lengths) and allocate the tasks to them, each task handling the match of the flow against one of the pattern subsets. The allocation information would be put into the FIFO queue of the corresponding PM.

Flow Buffer 1: It is where the incoming packet flows are reconstructed and buffered. The flow data are stored here until they have been processed.

PMs 8 and their FIFO Queues 9: PM 8 is the key component which deploys the match operations. Each PM, for each time, matches the assigned flow against one of the rule subsets under a certain mode (e.g. a certain PM 8 matches the current packet flow against the first subset in corresponding 3 pattern subsets under mode 2, while another PM 8 matches the current packet flow against the second subset . . . ). The matching tasks are generated by the scheduler 2 and stored in the FIFO queues 9 corresponding to the PMs 8. Note that the FIFO queues 9 only store the task descriptor (e.g. the pointer to the flow, the pointer to the pattern subset, and the mode to run with). After pattern matching, the flow is transmitted to a post processor 7 for further processing.

Now an example of a processing flow of $D^3$ system will be described with reference to FIG. 4 (a) and FIG. 4 (b).

The processing flow begins pre-processing at step S46. The pattern-set-partitioner 4 partitions original pattern set 5 (step S47) into several pattern subsets. The actual detection begins at step S41. The incoming traffic packets are buffered in the flow buffer 1 to form flows at step S42. Then, at step S43, the scheduler 2 requests the mode selector 3 to determine which mode should be selected for this flow to perform the distributed detection. The mode selector 3 selects the running mode for the current flow according to the system status and the packet flow size. At step S44, the scheduler 2 selects a number of PMs equal to the number of the partitioned pattern subsets according to the system status and the FIFO queues 9 length of the PMs 8 (e.g. the PMs with relatively short FIFO queue length). The scheduler then replicates the ready flow to the selected PMs (as described above, the allocation/sharing of the flow to the PMs can also be realized by sharing memory in the hardware platform having multiple CPUs and shared memory) and allocates the partitioned pattern subsets to the selected PMs with one to one correspondence. At step S45, the selected PMs perform the pattern matching of the flow against the patterns within the respective allocated pattern subsets, thereby realizing parallel pattern matching.

As described above, for a specific packet flow, the scheduler 2 and the mode selector 3 cooperate to determine a specific distributed detection mode (i.e. a certain number of pattern subsets). For different packet flows, different distributed detection modes may be selected. Accordingly, dynamic distributed detection for the packet flows can be realized without utilizing a certain fixed distributed detection mode for all packet flows.

4. A Practicable Implementation of the Pattern-Set-Partitioner (PSP)/Allocator

The following is one of the possible implementations of the PSP, in which it is supposed that the MWM algorithm is used, but it is not limited to that (Note that this implementation is the one used in the experiments which will be discussed thereafter). According to the MWM algorithm, given that the number of patterns is N, the percentage of the zero bad-character-shift (BCS) table entries is $P_{BCS=0}$, in which BCS=0 means that characters that may be matched exists, which needs to be looked up in the table. The average value of all the BCS table entries is $EL_{BCS}$. The time required for each 16-bit hash table lookup and each BCS table lookup is $\Delta_1$ and $\Delta_2$, respectively. The excepted/average time $C_{cost}$ consumed on detection for each incoming byte is given by:

$$C_{cost} = P_{BCS=0} \cdot \frac{N}{2^{16}} \cdot \Delta_1 + \frac{1}{MAX(1, EL_{BCS})} \Delta_2 \qquad (1)$$

In the prototype proposed by the inventors, a detection cost increment pattern allocation scheme is implemented based on the cost function shown above. Pattern allocations are required to be done for all the potential running modes, for example from Mode 1 to Mode N.

For example, for Mode n (i.e. the number of the partitioned pattern subsets is n), 1) n cost counters would be maintained for the n pattern subsets, respectively. Each counter represents the expected per byte detection time against the corresponding pattern subset.

2) All the patterns are allocated sequentially to the n subsets in the following way:

a) For a specific pattern, first, n testing assignments would be deployed on all the subsets to get the updated $P_{BCS=0}$ and $EL_{BCS}$ values, respectively;

b) Then, according to the cost function (1) shown above, the updated $P_{BCS=0}$, $EL_{BCS}$ values and n testing cost values would be obtained; and c) Then, the pattern would be assigned to the subset incurring the minimum cost increment.

Figure 5:
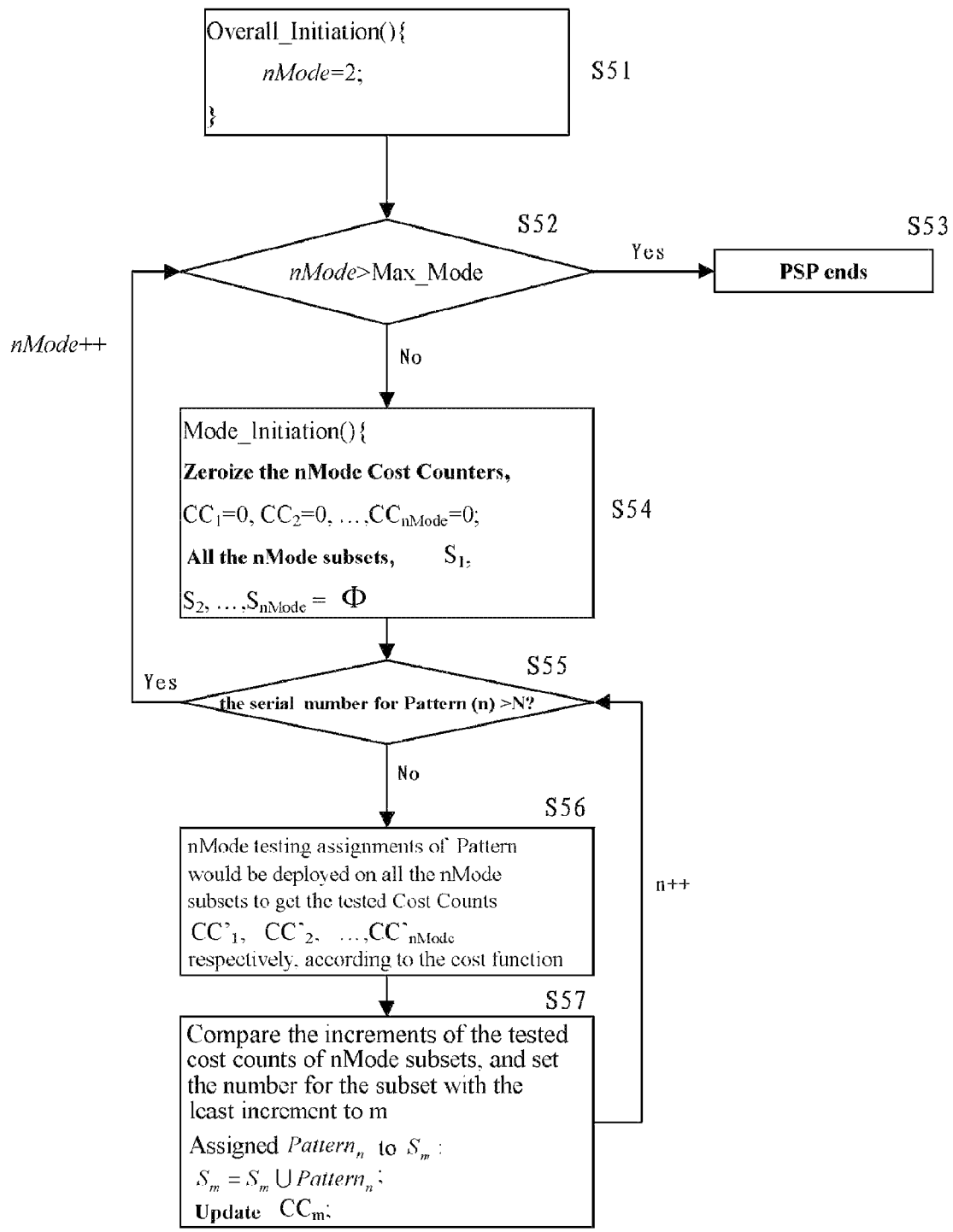
FIG. 5 is a flowchart for illustrating a processing flow of an implementation of a pattern-set-partitioner.

As shown in FIG. 5, a processing flow of the pattern-set-partitioner 4 based on the above equation (1) is illustrated. Initialization begins at step S51 to make the mode variable nMode start from 2. At step S52, whether the mode nMode is above the maximum mode Max_Mode is determined. If so, it indicates that all the modes have been processed and the process of PSP ends at step S53. Otherwise, the process goes into the cycle to process every mode nMode one by one. Namely, during the cycle, the current mode is initialized at step S54 to zero the nMode cost counters and all the nMode pattern subsets. At step S55, whether the serial number n for the Pattern$_n$ is above N is determined. If so, it indicates that the allocation of all the patterns have been done for the current mode and the process goes to step S52 to process the next mode. Otherwise, the process goes to step S56 where the nMode testing assignment of the current pattern Pattern$_n$ will be deployed on all the nMode subsets to get the tested cost counts respectively according to the cost function. Then, at step S57, the increments ($CC'_k$-$CC_k$) of the tested cost counts of k (from 1 to nMode) pattern subsets are compared and the serial number for the pattern subset with the least increment is set to m. Then the current pattern Pattern$_n$ is assigned to the pattern subset $S_m$ with the serial number m. Subsequently, the cost counter $CC_m$ is updated. The process goes back to step S55 after step S57 and proceeds to the allocation of the next mode.

In other words, the patterns are assigned one-by-one to aim at minimizing the k cost values of the pattern subsets expeditiously, thereby realizing the pattern set partitioning.

Besides the PSP scheme as proposed above, other PSP schemes may include:

1) Pattern set partition by the number of patterns: Simply trying to partitioning the pattern set according to the number of patterns and aiming at making every pattern subset have an equal number of patterns at best. For example, given a pattern set with N patterns, for Mode n, using this scheme, it is just required to allocate N/n patterns to each subset. This scheme is easy to implement but may not get optimized performance.

2) Pattern set partition by the size of patterns: Note that patterns have different lengths and therefore may require different storage size. Different combinations of the patterns may also result for different storage requirements. The aim of this scheme is to make the storage requirements of the subsets as small as possible. To achieve that, a similar approach to the one described in FIG. 5 may be used where the cost function (1) is replaced by the following:

$$C_{cost} = \sum_{P_i \in Subset} Sizeof(P_i) \qquad (2)$$

where the pattern sizes of all of the patterns $P_i$ in one mode subset are summed (Sizeof( )) to obtain the cost $C_{cost}$ associated to the storage requirement of the mode subset (Subset).

More specifically, pattern allocations are required to be done for all the potential running modes, for example, from Mode 1 to Mode N. For example for Mode n, a. n cost counters would be maintained for the n pattern subsets, respectively. Each counter represents the storage requirement for the corresponding pattern subset;

b. For a specific pattern, it would be assigned to the subset with the minimum cost count; and c. After the assignment, the cost counter of the corresponding subset would be updated.

With this scheme, there would be a storage balanced pattern set partition. But such scheme may not achieve optimum performance as well.

3) Pattern set partition by pattern prefixes/suffixes: For example, the given pattern set is {ab, ac, bd, be, abc, bcd, ccc, xxx, xyy}, and a prefix-based partition assigns the patterns with similar prefix to the same subsets, i.e. the original pattern set can be partitioned into four subsets, {ab, ac, abc}, {bd, be, bcd}, {ccc} and {xxx, xyy}. Prefix-based partitioning is also easy to implement.

Figure 6:
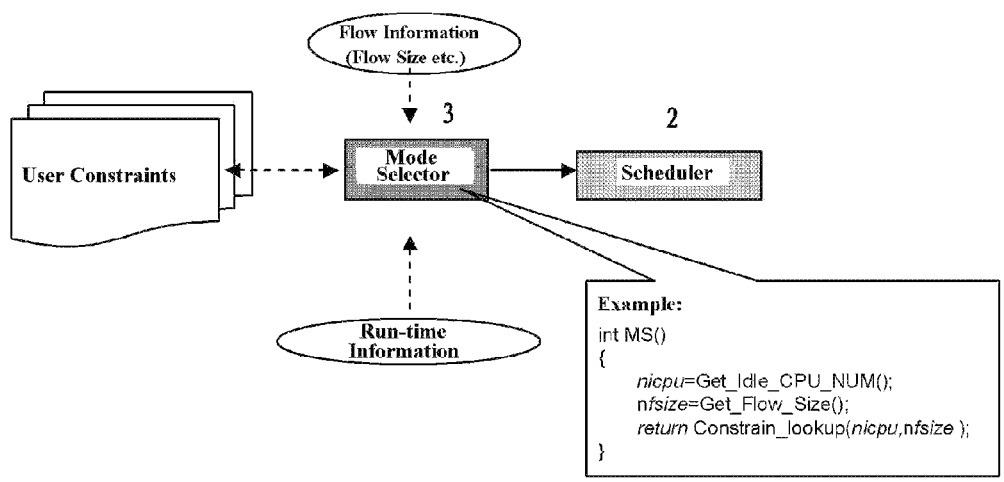
FIG. 6 is a diagram for illustrating an implementation of a mode selector.

5. The Implementation of the Mode Selector (MS):

FIG. 6 is a diagram for illustrating an implementation of a mode selector 3 in which the MS 3 functions are depicted. As shown in FIG. 6, for a specific incoming flow to be detected, MS 3 would first check the system status to see how many CPUs can be leveraged to perform the distributed detection (run-time information). Then, MS would lookup a user constraint table, which is pre-set by the operator/programmers, to determine which mode to run for the current flow according to flow information such as the flow-size, run-time information, etc. and then provide it to the scheduler 2. The pre-set user constraints (i.e. principles of selecting the running mode) may include (in priority decreasing order): 1) if overall processor utilization $U_{current} > U_{limit}$, running in Mode 1; 2) if flow size $S_{flow} < S_{limit}$, running in Mode 1; 3) Mode=F ($S_{flow}$, $U_{current}$), namely the running mode is the function of current flow size $S_{flow}$ and current processor utilization $U_{current}$. Experimental results show that even very simple algorithms/rules for MS to select a running mode in run-time (i.e. user constraints) can get pretty good performance gains so that idle processor resources are well utilized while the negative effects from the overhead are avoided.

Figure 7:
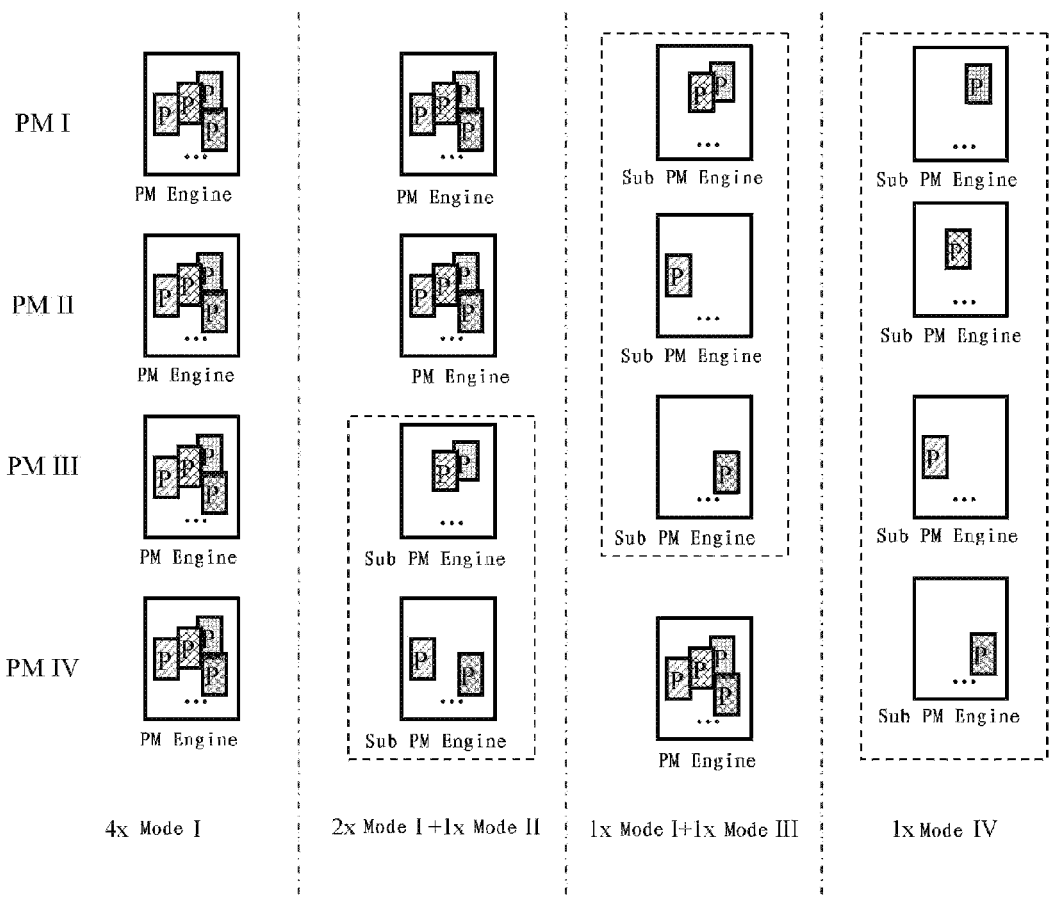
FIG. 7 is a diagram for illustrating an example of four running modes for a 4 cores/CPUs case.

FIG. 7 is a diagram for illustrating an example of four running modes for a 4 core/CPU case, and thereby it gives a demonstration of the $D^3$ idea according to the present invention. As shown in FIG. 7, each core/CPU forms one PM engine or sub-PM-engine and 4 specific cases result in four different system organizations:

1) When there are no packet flows consuming over 25% of the overall computation power, no rule-set partition is required and four full PM engines are deployed;
2) When there are packet flows consuming over 25% but no larger than 33%, two full PM engines are deployed to handle the trivial flows, and the two sub PM engines, each containing half of the rule set, are deployed to handle the hot flow(s). Note that the hot flows are replicated with 2 copies;
3) When there are packet flows consuming over 33% but no larger than 50%, only one full PM engines is deployed to handle the trivial flows, and the three sub PM engines, each containing one third of the rule set, are deployed to handle the hot flow(s). Note that the hot flows are replicated with 3 copies; and
4) When there are packet flows consuming over 50% of the computation power, all four sub PM engines are deployed to work together to handle cloned workload. Each one of them contains only one fourth of the rule set.

6. Experiment Results

Figure 8:
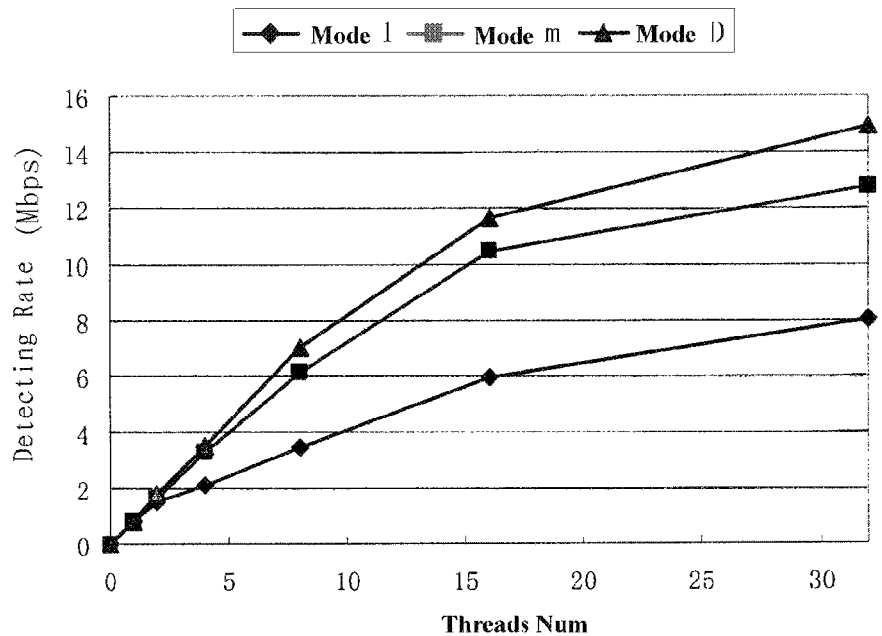
FIG. 8 is a graph for showing performance/scalability comparison of mode l, m, and D (unbalanced flow size).
Figure 9:
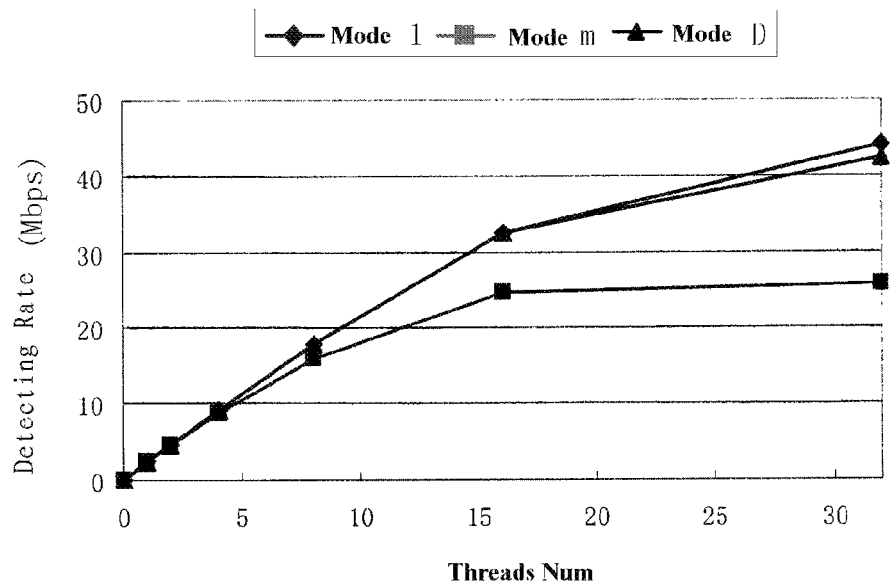
FIG. 9 is a graph for showing performance/scalability comparison of mode l, m, and D (balanced flow size).

FIG. 8 and FIG. 9 provide the evidence/data-results of the feasibility of the present invention, where the performance under the different settings of PM (using the MWM algorithm) using the traffic trace file from DEFCON against the snort rule sets (see Snort-the de Facto Standard for Intrusion Detection/Prevention, obtained from www.snort.org) is demonstrated.

Platform Used SunFire 2000T (Niagara) Server, with UltraSPARC T1 Processor (8 cores with 4 Hardware threads each, i.e. a total of 32 logic CPUs), 8 GB DDR2 memory, and 3 MB L2 cache.

Case I: Original Trace, 100 K flows, Max Flow Size=1.077 MB

FIG. 8 is a graph for showing performance/scalability comparison of mode l, m, and D (unbalanced flow size). As shown in FIG. 8, "Mode 1" means the running Mode ID for all the packet flows always equals 1, namely all the PMs are always running in Mode 1 (i.e. no distributed detection where the rules are partitioned is utilized) and utilize the traditional flow-based load-balancing scheme. "Mode m" means the Mode ID is always equal to the number of the PM threads, namely the scheme of detection utilizing fixed Mode m for all the packet flows, in which m is equal to the number of the running PM threads. "Mode D" means the detection mode is selected dynamically, namely the $D^3$ scheme of the present invention, and the running mode is determined dynamically in run-time. Furthermore, the simple user constraints used here are: $U_{limit}$=70%, $S_{limit}$=32 KB, and F($S_{flow}$, $U_{current}$)= Min {32, (100%−$U_{current}$) $Log_2 S_{flow}$}, As shown in FIG. 8, Mode D and Mode m distinctly outperform Mode 1 in Case I.

Case II: Modified Trace: all the Flows that have Sizes Larger than 64 KB are Chopped to 64 KB, 100 K Flows FIG. 9 is a graph for showing performance/scalability comparison of mode l, m, and D (balanced flow size). The meanings of "Mode 1", "Mode m" and "Mode D" in FIG. 9 are the same as those in FIG. 8 and the same user constraints are used. It can be seen from FIG. 9 that it is different from the case in FIG. 8. Mode 1 distinctly outperforms Mode m. Since the flow sizes are balanced in this case, using large Modes would bring little gain; on the other hand, the overhead is distinct, which results in performance degradation. But for Mode D, the mode is well controlled according to the flow size, therefore it can be seen that Mode D performs nearly as well as Mode 1 in Case II.

7. A Demo of where the Gain of the Present Invention Comes from

Figure 10A:
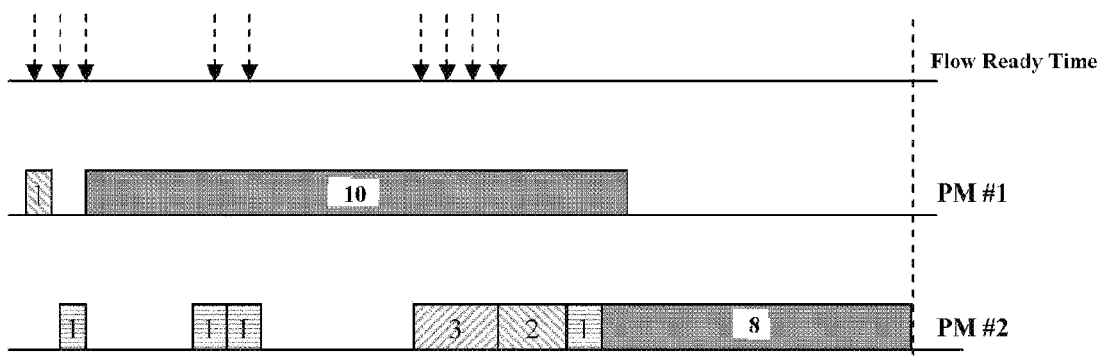
FIG. 10 (a) is a diagram for showing Naïve load-balancing (by flows).
Figure 10B:
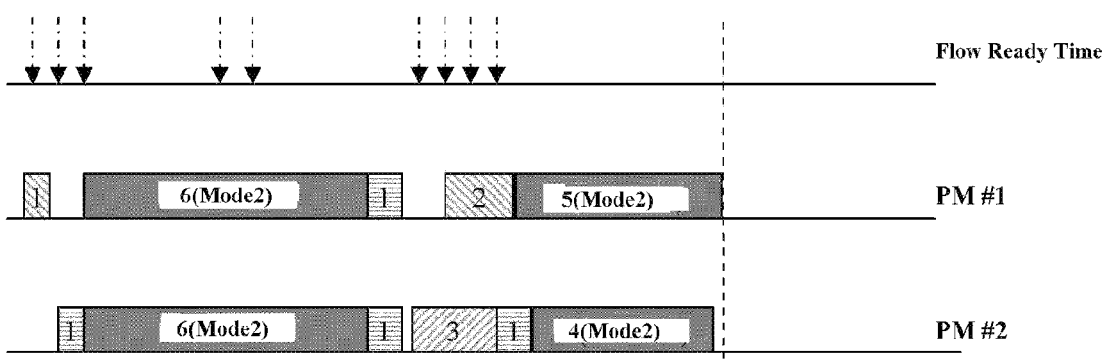

FIG. 10 (*a*) is a diagram for showing Naïve load-balancing (by flows). FIG. 10 (*b*) is a diagram for showing load-balancing base for the scheme according to the present invention.

FIG. 10 (*a*) and FIG. 10 (*b*) demonstrate the processing (PM) trace in a dual-PM system, wherein the horizontal axis indicates time. Suppose that the flows in solid stand for hot flows. In FIG. 10 (*b*), the first hot flow is set to run in Mode 2 so that each of the PM engine handles the match within a subset (please note that the overhead 6+6>10), and the second hot flow is set to run in Mode 2 as well (please also note that the overhead 5+4>8). The other small flows are all run in Mode 1.

It can be seen that, even though running in Mode 2 (FIG. 10 (*b*)), processing overheads (6+6>10 and 5+4>8) are incurred. However, since Mode 2 makes it possible for the system to better utilize all the PM engines (ex. less idle time is observed in the case shown in FIG. 10 (*b*) than that in FIG. 10 (*a*)), better performance, i.e. less processing latency, is achieved.

The present invention can be realized by a system for parallel flow-awared pattern matching and a method thereof. The system and method can perform distributed detection by partitioning rules/patterns set to thereby realize load-balancing parallel flow-awared pattern matching. The present invention can also be realized by a program or computer readable recording media recording program thereon, and the program can cause the computer to perform the parallel flow-awared pattern matching method according to the present invention described above.

The invention claimed is:

1. A parallel flow-aware pattern matching system having one or more central processing units (CPUs) for performing distributed detection for incoming flows, comprising:
a pattern-set-partitioner for partitioning a pattern set for pattern matching of patterns in said pattern set against incoming flows into a number of different pattern subsets in advance;
a plurality of pattern matching engines, each performing pattern matching by comparing the incoming flows to a different pattern subset; and
a scheduler for selecting a number of pattern matching engines equal to the number of the partitioned pattern subsets from all the pattern matching engines and allocating pattern matching tasks, each being used to perform flow matching of incoming flows against one pattern subset, to the selected pattern matching engines.

2. The system according to claim 1, further comprising:
a mode selector for selecting, for a specific incoming flow to be detected, a distributed detection mode which is identified by the number of the pattern subsets by partitioning the pattern set and providing the selected mode to the scheduler.

3. The system according to claim 2, wherein:
for the specific incoming flow to be detected, the mode selector checks system status to obtain run-time information including a number of CPUs which can be leveraged to perform distributed detection; then looks up a pre-set mode selection principle according to flow information and the run-time information to decide the distributed detection mode selected for the flow; and subsequently provides the distributed detection mode to the scheduler.

4. The system according to claim 1, wherein:
the scheduler selects the pattern matching engines to perform distributed detection based on FIFO queues lengths of the pattern matching engines.

5. The system according to claim 4, wherein:
the scheduler puts allocation information into the FIFO queues of corresponding pattern matching engines, wherein the FIFO queues each store only a pattern matching task descriptor selected from the group consisting of a pointer to the flow, a pointer to the pattern subset, a distributed detection mode to be used, and a combination thereof.

6. The system according to claim 1, wherein:
the pattern-set-partitioner partitions the pattern set according to a detected cost increment pattern allocation scheme to allocate the patterns to the pattern subset with a minimum increment of detected cost values one by one expeditiously.

7. The system according to claim 6, wherein:
in the detected cost increment pattern allocation scheme, expected/average time $C_{cost}$ consumed on detection for each incoming byte is calculated as the detected cost value by the following equation:

$$C_{cost} = P_{BCS=0} \cdot \frac{N}{2^{16}} \cdot \Delta_1 + \frac{1}{MAX(1, EL_{BCS})} \Delta_2$$

where N is number of patterns; $P_{BCS=0}$ is percentage of zero bad-character-shift BCS table entries, $EL_{BCS}$ is average value of all the BCS table entries, and $\Delta_1$ and $\Delta_2$ are time required for each 16-bit hash table lookup and each BCS table lookup, respectively.

8. The system according to claim 1, wherein:
the number of the pattern subsets partitioned by the pattern-set-partitioner is the same as that of all the pattern matching engines, and the scheduler selects all the pattern matching engines so that the pattern matching engines are one to one corresponding to the partitioned pattern subsets for each incoming flow.

9. The system according to claim 2, wherein:
all potential modes of the pattern subsets partitioned in advance by the pattern-set-partitioner are stored in a mode database; and the mode selector selects the distributed detection mode from the mode database for the specific incoming flow to be detected.

10. The system according to claim 3, wherein the distributed detection mode selected by the mode selection principle is a function of the size of the flow to be detected and current processor utilization.

11. A parallel flow-aware pattern matching method for a system having one or more central processing units (CPUs) for performing distributed detection for incoming flows, comprising the steps of:
partitioning a pattern set for pattern matching of patterns in said pattern set against incoming flows into a number of different pattern subsets in advance;
selecting a number of pattern matching engines equal to the number of the partitioned pattern subsets from all the pattern matching engines for performing pattern matching for the incoming flows; and
allocating pattern matching tasks, each being used to perform flow matching of incoming flows against one of the different pattern subsets, to the selected pattern matching engines.

12. The method according to claim 11 further comprising the step of:
selecting, for a specific incoming flow to be detected, a distributed detection mode which is identified by the number of the pattern subsets by partitioning the pattern set.

13. The method according to claim 12, wherein selecting the distributed detection mode further comprises:
checking, for the specific incoming flow to be detected, system status to obtain run-time information including a number of CPUs which can be leveraged to perform distributed detection; and then looking up a pre-set mode selection principle to determine the distributed detection mode selected for the flow according to flow information and run-time information.

14. The method according to claim 11, wherein: selecting the pattern matching engines to perform distributed detection is based on FIFO queues lengths of the pattern matching engines.

15. The method according to claim 14, further comprising the step of:
putting allocation information into the FIFO queues of corresponding pattern matching engines, wherein the FIFO queues each store only a pattern matching task descriptor selected from the group consisting of a pointer to the flow, a pointer to the pattern subset, a distributed detection mode to be used, and a combination thereof.

16. The method according to claim 11, wherein partitioning a pattern set for pattern matching into a number of pattern subsets in advance further comprises the step of:

partitioning the pattern set according to a detected cost increment pattern allocation scheme to allocate the patterns to the pattern subset with a minimum increment of detected cost values one by one expeditiously.

17. The method according to claim 16, wherein:

in the detected cost increment pattern allocation scheme, expected/average time $C_{cost}$ consumed on detection for each incoming byte is calculated as the detected cost value by the following equation:

$$C_{cost} = P_{BCS=0} \cdot \frac{N}{2^{16}} \cdot \Delta_1 + \frac{1}{MAX(1, EL_{BCS})} \Delta_2$$

where N is number of patterns; $P_{BCS=0}$ is percentage of zero bad-character-shift BCS table entries, $EL_{BCS}$ is average value of all the BCS table entries, and $\Delta_1$ and $\Delta_2$ are time required for each 16-bit hash table lookup and each BCS table lookup, respectively.

18. The method according to claim 11, wherein:

the number of the pattern subsets partitioned in advance is the same as that of all the pattern matching engines, and all the pattern matching engines are selected so that the pattern matching engines are one to one corresponding to the partitioned pattern subsets for each incoming flow.

19. The method according to claim 12, wherein:

all potential modes of pattern subsets partitioned in advance are stored in a mode database; and the distributed detection mode is selected from the mode database for the specific flow to be detected.

20. A computer program product for a parallel flow-aware pattern matching method for performing distributed detection for incoming flows, the computer program product comprising:

a computer readable recording medium storing a computer program comprising;

first program instructions to partition a pattern set for pattern matching of patterns in said pattern set against incoming flows into a number of different pattern subsets in advance;

second program instructions to select a number of pattern matching engines equal to the number of the partitioned pattern subsets from all the pattern matching engines from all the pattern matching engines for performing pattern matching for the incoming flows;

third program instructions to allocate pattern matching tasks, each being used to perform flow matching of incoming flows against one of the different pattern subsets, to the selected pattern matching engines; and wherein the first, second, and third program instructions are stored on the computer readable media.

\* \* \* \* \*